(No Model.) 2 Sheets—Sheet 1.

H. B. GALE.
VALVE MECHANISM.

No. 570,727. Patented Nov. 3, 1896.

Witnesses.

Inventor.
Horace B. Gale
per Fred E. Tasker,
Attorney.

(No Model.) 2 Sheets—Sheet 2.

H. B. GALE.
VALVE MECHANISM.

No. 570,727. Patented Nov. 3, 1896.

Witnesses.

Inventor.
Horace B. Gale
per Fred E. Asker
Attorney.

UNITED STATES PATENT OFFICE.

HORACE B. GALE, OF SAN FRANCISCO, CALIFORNIA.

VALVE MECHANISM.

SPECIFICATION forming part of Letters Patent No. 570,727, dated November 3, 1896.

Application filed February 1, 1894. Serial No. 498,768. (No model.)

*To all whom it may concern:*

Be it known that I, HORACE B. GALE, a citizen of the United States, residing in the city and county of San Francisco and State of California, have invented certain new and useful Improvements in Valves for Regulating the Flow of a Fluid Through a Port or Passage, of which the following is a specification, reference being had to the drawings accompanying and forming a part of the same.

My invention relates especially to that class of valve mechanisms in which the main valve or valves may be set to open automatically to permit a flow through the passage in either one direction or the other, as may be required, and to close automatically to prevent a flow in the wrong direction, the direction in which a flow is in any case permitted or prevented being determined by the operation of a small auxiliary valve.

Combinations of valves by which the direction of flow of a fluid back and forth through a passage is regulated in a manner similar to that described are used in certain kinds of hydraulic elevators; and a combination of that class is covered by United States Letters Patent issued to me December 12, 1893, and numbered 510,638.

The main object of my present invention is to provide improved means whereby valves for regulating the flow of a fluid, in such cases as do not admit readily of direct handling, may be controlled easily by a small auxiliary valve situated at a convenient point, and whereby also the auxiliary valve may be operated to determine as required the direction of flow permitted through the main-valve port.

The valves hereinafter described are to be applied chiefly to controlling the flow of water, steam, or air through large passages and under heavy pressures, especially where, by reason of the inaccessibility of the main valve, or other cause, it is desired to operate it easily from a distant point, as in underground water-mains, the fluid-passages of hydraulic elevators, &c. The essential mechanism is applicable to cases in which the flow is always in the same direction, as well as to those in which it may be in either direction, and is thus capable of a wide range of useful applications.

Figure 7:
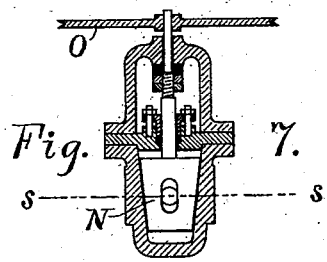
Figure 8:
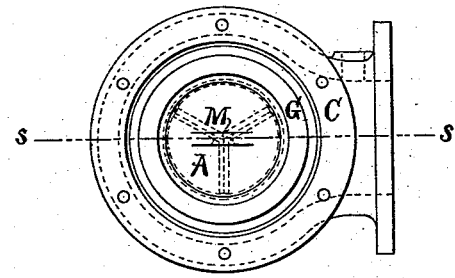

The devices constituting my invention are illustrated by the accompanying drawings, which, with the exception of Figures 7 and 8, represent vertical sections of the apparatus in the plane of the axes of the main fluid-passages.

The same letters of reference indicate corresponding parts in all the views.

Figure 1:
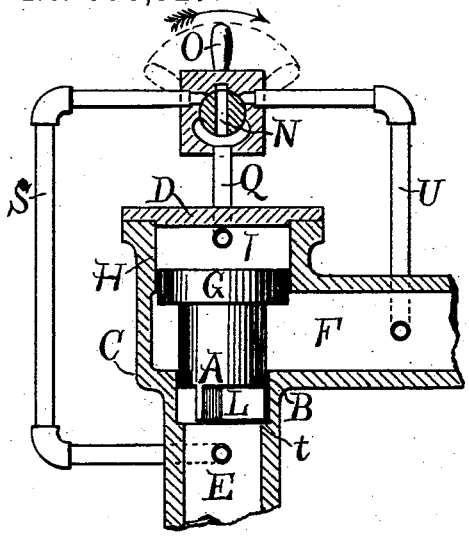
Figure 2:
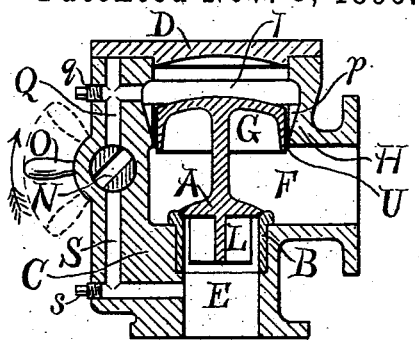
Figure 3:
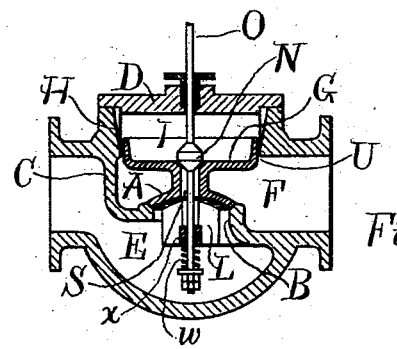
Figure 4:
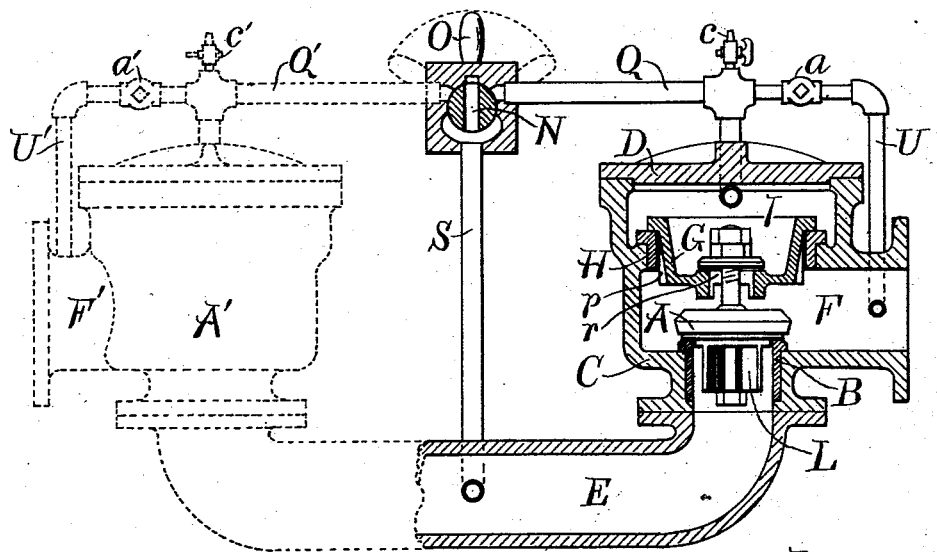
Figure 5:
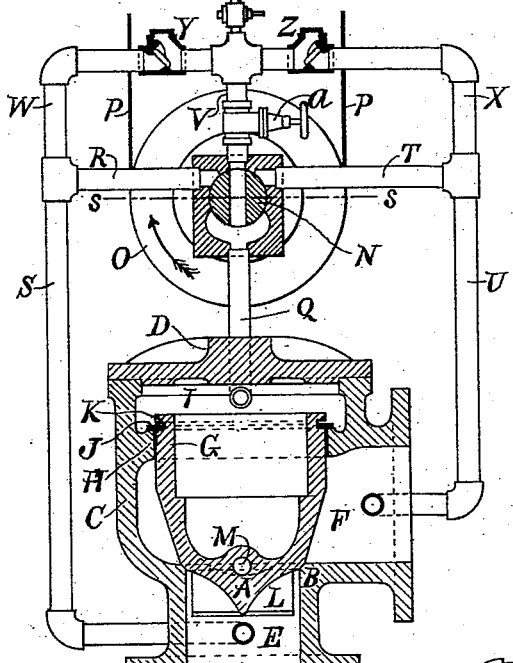
Figure 6:
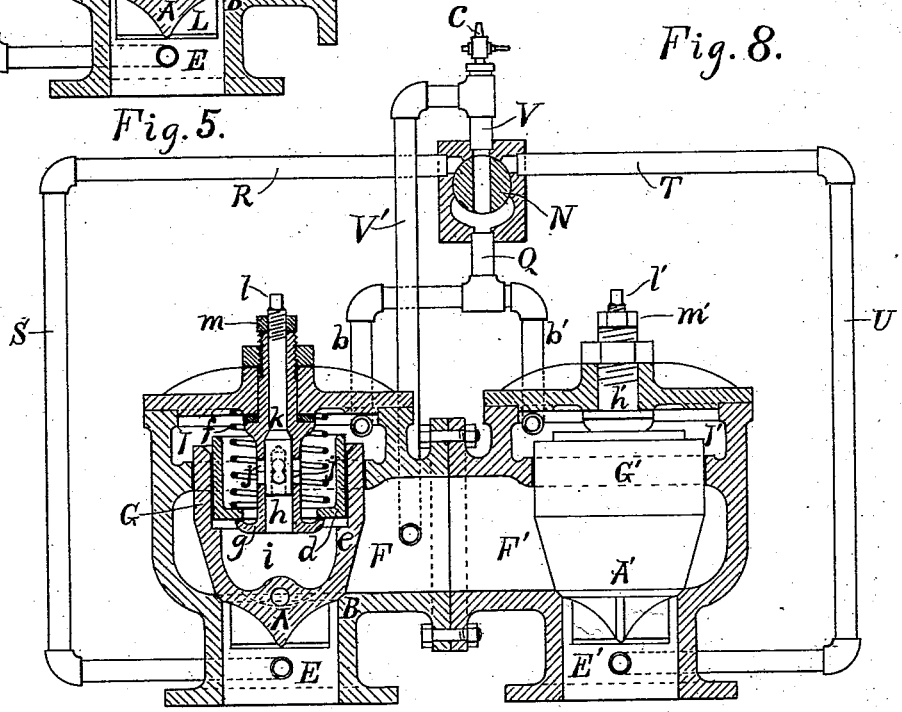

Fig. 1 exhibits in diagrammatic form the essential elements of the main combination and serves for explaining the general principle of its operation. Fig. 2 shows the mechanism as I prefer to construct it for use in controlling the flow of elastic fluids, such as steam or air, and illustrates the particular type of main valve which I prefer to use and a special arrangement of one of the auxiliary passages; and Fig. 3 shows also a special arrangement of the other auxiliary passage. Figs. 4, 5, and 6 show forms of the mechanism designed for use with inelastic fluids, such as water, and illustrate besides a number of auxiliary devices, one or more of which are sometimes combined with the essential elements of the mechanism to improve its operation. In the drawings these additional features have been divided between Figs. 4, 5, and 6 to avoid the confusion in appearance that would result from an attempt to represent them all together in a single view, though there is nothing in their construction to prevent their all being attached at once to the same main combination. Fig. 8 is a plan view of the valve shown in section in Fig. 5 with the cover of the casing removed, and Fig. 7 is a longitudinal section through the casing of the auxiliary valve in the plane of its axis.

Referring to Fig. 1, A indicates a main valve, here represented as a cylinder, capable of sliding vertically in the cylindrical valve-casing C, so as to cover or uncover the edges of the port B. The valve is guided in its movements by the attached radial plates L, which in the closed position, as shown, rest upon the ledge *t* of the casing.

G indicates an actuating piston or plunger connected with the main valve, and which may be combined in one piece with it, as shown. The actuating-piston G slides freely in the cylinder or ring H.

I indicates an inclosed fluid-chamber, which I call the "pressure-chamber," above the piston G.

D indicates a cover secured to the casing by bolts or equivalent means, E and F portions of the main fluid-passage situated on opposite sides of the port B.

N indicates an auxiliary valve by means of which the movements of the main valve A are regulated. It is here represented in the form of a multiple-way cock, which can be turned into the different required positions by the handle or actuating device O, attached to its spindle. The pipe or passage Q connects the chamber I with the auxiliary valve N. The pipe U leads to the main fluid-passage at F, on the near side of the port B, and the pipe S to the main fluid-passage at E, on the farther side of the port B.

The area of the actuating-piston G is preferably larger than that of the port B, being usually made about twice as great, so that an annular area equal to this excess is exposed to upward pressure from the fluid in the passage at F, as shown. The whole force tending to lift the valve thus consists of the sum of the pressure of the fluid in the main passage at E acting on the under side of the valve A and the pressure on the other side of the port at F acting in the same direction on the said annular area of the actuating-piston. This total force is opposed by the pressure of the fluid in the chamber I acting in the contrary direction.

To explain the general principle of operation of the device, referring to Fig. 1, let us first suppose the cock N to be turned a certain distance in the direction of the arrow, so as to connect the pressure-chamber I with the main passage at F through the auxiliary passage U. The fluid-pressure existing at the point F is thus communicated to the outer side of the actuating-piston G. By this means the pressure on the annular area, or excess of the piston area over that of the port B, is balanced, and the pressure of the fluid at E, acting on the area of the port B to lift the valve, is opposed only by the pressure at F acting downward on an equal effective area. If the pressure at E is greater than the pressure at F, which indicates a tendency of the fluid to flow through the valve-port from E to F, the valve will be lifted by the superior pressure underneath it and the fluid will flow in the direction from E to F; but if the pressure at E is less than the pressure at F, indicating a tendency of the fluid to flow in the reverse direction, or from F to E, the excess of pressure at F, acting downward on the piston G, will keep the valve closed. In other words, when the auxiliary valve is set so as to connect the chamber I with the main passage at F, the action of the main valve is exactly analogous to that of a check-valve opening from E to F, permitting the fluid to flow freely in this direction, and closing automatically against a tendency to flow in the reverse direction.

To shut off the flow from E to F, the cock N may be turned in the direction opposite to the arrow for an equal distance to the other side of its central position, so as to connect the chamber I, through the auxiliary passage S, with the main passage at E. The superior pressure at E being thus transmitted to the chamber I, the pressure on the area of the valve itself is balanced and the valve is closed by an unbalanced force due to the excess of the pressure at E over the pressure at F acting downward on the annular area by which the actuating-piston is larger than the port B. With the auxiliary valve set to connect the chamber I with the main passage at E, therefore, no flow can take place from E to F; but if the tendency to flow is in the opposite direction the excess of pressure at F, acting upward on the exposed annular area of the piston G, will lift the valve, permitting the fluid to flow freely from F to E. Thus by properly manipulating the auxiliary valve N the main valve A is made to act as a check-valve, opening to permit a flow in either one or the other direction, as thus determined, and closing automatically against a reverse flow.

Referring again to Fig. 1, when the auxiliary cock is in its middle position, as shown, no fluid can enter or leave the chamber I unless by leakage. Therefore, assuming that leakage into and out of the chamber I can be prevented, it is possible, by setting the cock in this way, to hold the main valve A in any desired position, either open or shut.

Means to prevent harmful leakage of fluid out of the chamber I when the valve is closed, without making the piston G tight-fitting or interfering in any way with its freedom of movement, are hereinafter described. In this regard it may be pointed out here that such leakage could only occur in case the pressure at E exceeded that at F, in which case the superior pressure acting upward on the valve A might gradually force the fluid out of the chamber I through the small annular space around the piston G and thus open the valve A, but if the superior pressure were at F it would necessarily be communicated to the chamber I and would hold the valve closed, there being in this case no tendency to leak around the piston G either into or out of the chamber I. It is apparent, therefore, that unless leakage around the piston G is absolutely prevented the simple combination of Fig. 1 can be depended upon to close the passage against a permanent pressure in only one direction. However, in many cases, by so placing the valve that the tendency of the fluid is ordinarily to flow from F to E, no special precautions against such leakage are required. Indeed, as will be explained farther on, I generally utilize the leakage-space around the piston G for one of the auxiliary passages—viz., to connect the chamber I with the main passage at F, as an equivalent for the pipe U in Fig. 1.

Fig. 2 illustrates this form of the auxiliary passage between F and I, and shows also an example of the special type of main valve which I generally prefer to use, to wit, a direct-seated or poppet valve, which rests, when closed, upon the edges of the port B. Fig. 2 represents one of the practical forms given to the general combination of Fig. 1 when it is to be used to control the flow of an elastic fluid, for example, for the purpose of the admission or exhaust valve of a steam-engine.

In most cases, in practice, where a valve mechanism of this class can be usefully applied to regulate the flow of an elastic fluid the tendency to flow is chiefly in one direction, being at most only occasionally in the opposite direction. For instance, in the case of the admission-valve of a steam-engine the tendency of the steam is generally to flow toward the cylinder, provision for a reverse flow being required only to relieve excessive compression or an accidental accumulation of water in the steam-cylinder.

To apply the combination shown in Fig. 2 to this purpose, therefore, I would place it with the part of the main passage E toward the cylinder, so that the tendency of the steam ordinarily would be to flow through the port from F to E. Then to open the main valve for admission of steam to the cylinder the cock N, which might be operated by the mechanism of the engine, is turned to the left, so as to connect the pressure-chamber I, through the auxiliary passage S, with the main passage at E, i. e., with the cylinder. The passage S being larger than the annular passage U around the loosely-fitting piston G, the pressure at I is thus approximately equalized with that at E, and the greater pressure at F, acting on the under side of the piston G, lifts the valve and the steam flows through the port from F to E. To cut off the steam, the cock N is turned in the opposite direction, so as to close the passage S and permit the superior pressure at F to be transmitted to the chamber I through the passage S, thus closing the valve. The chamber I being now in communication with the passage at F, through the auxiliary passage U, no steam can flow from F to E, that is, into the cylinder; but the main valve when thus set is ready to open freely to relieve any excess of pressure in the reverse direction which may result from one of the causes mentioned.

In Fig. 2 the auxiliary valve N and the auxiliary passages Q and S, connecting the chamber I with the main passage at E, are included in the main-valve casing C. In case it is desired to put the auxiliary valve at a distance, pipes may be run from the plugged outlets q and s, extending the auxiliary passage to the desired point.

I prefer the poppet-valve of Fig. 2 to the piston type illustrated by the general diagram, because a piston-valve cannot readily be made tight without involving friction in its movement. I do not, however, limit myself to the use of this special type of main valve or to this special arrangement of the auxiliary passages in all cases.

The tapering grooves $p$, cut in the sides of the cylinder H in Fig. 2, are designed to increase the area of the auxiliary passage U as the piston G rises. Suppose the cock N to be opened slightly, so that the pressure in the chamber I is lowered by the escape of fluid therefrom into the main passage at E sufficiently to cause the valve A to rise from its seat. The valve A and actuating-piston G will continue to rise until the constantly-enlarging leakage-opening afforded by the slots $p$ permits the fluid to enter the chamber I as fast as it can escape therefrom through the auxiliary valve N and passage S. The pressure in the chamber I will then remain in equilibrium and the piston G and valve A will be held in a partially-raised position. If, now, the auxiliary valve N be opened wider, the piston G and valve A will rise further, until the flow into and out of the chamber I is again equalized. If the auxiliary valve N be partially closed, diminishing the rate of flow out of the chamber I, the pressure therein will increase and the piston G will be lowered until the area of opening of the slots $p$ is diminished to correspond with that of the auxiliary valve N. It is apparent that by properly proportioning the slots or grooves $p$ the extent of opening of the main valve A may thus be made to correspond more or less closely with that of the auxiliary valve N, and in this way the rate of flow of the fluid through the main-valve port may be varied or regulated by means of the auxiliary valve.

No claim is herein made for any special form of auxiliary valve, as it is apparent that a great variety of well-known types of valves, or combinations of such valves, may be readily adapted to the purpose.

Whatever form of auxiliary valve is employed, however, and whatever the manner of its operation, the device just described will cause the main valve to follow the movements of the auxiliary valve and to operate in a similar manner.

The general arrangement of mechanism shown in Fig. 2 is what I generally prefer for use with elastic fluids; but it is apparent that all the devices which have been described are applicable also to regulating in the same way the flow of inelastic fluids. It is evident also that the grooves or slots $p$ are not essential to the operation of the mechanism in all cases, but that they may be added whenever desired to bring the movements of the main valve under more perfect control. Various equivalent devices for the grooves in the cylinder shown in Fig. 2, by which the size of the auxiliary fluid-passage U may be varied by the movement of the actuating-piston, will naturally occur to a mechanic, and I therefore do not confine my claim to the special devices shown for this purpose. The grooves may be cut, for instance, in the sides of the actuating-piston instead of in the cylinder.

In Fig. 3 the auxiliary passage S from the chamber I to the main passage at E is carried through the actuating-piston G and main valve A instead of through the casing C, and the auxiliary valve N is operated by a spindle O, whose axis is in the line of motion of the main valve. The spindle O is brought through the casing for attaching a handle or device for operating the auxiliary valve from the outside and passes down through a guide-ring $x$ and closing-spring $w$ on the lower side of the main valve. The other auxiliary passage U in Fig. 3 is between the sides of the cylinder H and the piston G, as before; but the arrangement of the passage U in this case is not important. By the device shown in Fig. 3 the movement of the main valve A may be made to follow very closely that of the auxiliary valve N.

Fig. 4 represents the form of the general combination which I usually apply to controlling the flow of water, and illustrates especially my preferred method of connecting the main valve A to the actuating device G, viz., by a loose connection $r$, which permits a certain amount of play or free movement to the main valve, while not interfering injuriously with its control by the piston or plunger G and auxiliary valve N, in the manner before described. Such a loose connection makes it unnecessary that the axes of the cylinder H and of the valve-seat B should be exactly coincident and allows the main valve freedom to adapt itself to its seat in closing.

In Fig. 4 and the succeeding figures, which represent valves designed for use with water or other inelastic fluids, the actuating device G is in the form of a plunger sliding in the fixed ring H.

The auxiliary passage connecting the chamber I and the main passage at F in Fig. 4 is partly between the plunger G and ring H, as in Fig. 2, and partially through the special pipe U. The latter contains a regulating-cock $a$, used to adjust the speed of closing of the main valve by varying the size of the passage.

In those cases where means are required to prevent any flow of fluid through the main passage in either direction when the auxiliary valve N is in its middle position I generally prefer to combine with the main valve, actuating-plunger, and pressure-chamber a second similar mechanism placed in series with it in the same passage and turned the opposite way with reference to the direction of flow of the fluid. The dotted lines in Fig. 4 show how a second similar valve A' may be combined in series with the valve A, the single auxiliary valve N being employed to control both main valves, which are thus operated simultaneously.

It is evident that when the auxiliary valve N is in its middle position, as shown, the valve A of Fig. 4 would not be sufficient alone to prevent a flow of fluid through the main passage in the direction from E to F, as a sufficient pressure, acting from E toward F, would be able to lift the valve, forcing a certain quantity of fluid out of the chamber I, as heretofore explained in connection with Fig. 1; but with the auxiliary valve in the position shown the valve A will effectually prevent any flow of fluid through the passage in the direction from F to E, as any increase of pressure at F, being communicated to the chamber I, would hold the valve more tightly to its seat. At the same time the similar valve A', being turned the opposite way from the valve A, will effectually prevent any flow in the contrary direction or from F' to E. With the auxiliary valve in this position, therefore, the effect of the valves A and A' is the same as that of a pair of simple check-valves in series and oppositely faced, and the combination is thus capable of closing the passage securely against a pressure of the fluid tending in either direction without the necessity of any device for preventing leakage around the plunger G, which may be made to fit loosely enough in the cylinder H to allow it to move without interference from friction.

When the controlling-handle O in Fig. 4 is turned toward the right, so as to connect the chamber I with the passage at E, the valves A and A' are made to operate like a pair of check-valves in series and facing the same way, both opening to permit a flow of fluid from F to E and closing automatically or remaining closed against a contrary flow. Similarly, by turning the handle O and valve N an equal distance to the left from the middle position, the valves are set to permit the fluid to flow from E to F, but not from F to E. The use of the second main-valve mechanism A', arranged as shown in the combination, accordingly enables it to perform an additional function, while retaining also all the useful functions of the simpler combinations illustrated in Figs. 1 and 2.

It is immaterial whether a piston, or plunger or other mechanical equivalent is employed for the actuating device G. For example, a flexible diaphragm may be used for that purpose, if desired.

The addition of a second main valve and its actuating device is not always essential, even when it is required to close the passage against a flow in either direction, as it is usually possible to make a single valve and plunger sufficiently water-tight when closed by the means illustrated by Fig. 5. Here J indicates a piece of flexible material, such as leather or rubber, fitting loosely in a groove K around the actuating-plunger G, and which bridges the narrow space between it and the fixed ring H when the valve is closed, so as to prevent leakage of the fluid from the chamber I to the passage at F.

V, W, and X indicate small by-pass pipes communicating with the upper middle port of the auxiliary valve N, and by way of the pipes S and U with the main passage on each side of the main valve. The flow of the fluid through these by-pass passages is controlled by the check-valves Y and Z, which, as shown, are arranged to open inwardly toward the auxiliary valve, so that whenever the cock N is set in its middle position, or so as to connect passages V and Q, the greater of the two pressures in the main passage at either E or F, as the case may be, will be communicated to the chamber I, and thus the main valve will be closed and held so against a tendency of the fluid to flow in either direction as long as the cock N is kept in its middle position.

To prevent the too-sudden closing of the main valve, which might cause shocks or slamming, I add a throttle-valve $a$, Fig. 5, by which the size of the opening through which the fluid enters the chamber I can be adjusted. A cock $a$, designed for the same use, is shown in Fig. 4, and a more elaborate device for a similar purpose in Fig. 6, which will be explained farther on. The eye M in the back of the main valve in Fig. 5 is for the purpose of lifting it out of the casing. The wheel O and cord P are devices for actuating the auxiliary valve N.

In regard to the packing J it may be said that there are some objections to the use of flexible packing which apply especially when the water flowing through the valve is hot, and for this reason, in cases where it is necessary to be able to prevent any flow or leakage of fluid past the valves in either direction, I generally prefer to use, instead of the by-pass pipes W and X, the check-valves Y and Z, and the packing J, a second main valve in series with the first, as already described.

Fig. 6 represents a pair of valves of the same construction as shown in Fig. 5, coupled in series for the purpose mentioned. These valves are shown with the parts F of the main passage brought together, instead of the parts E, as in Fig. 4, in order to illustrate the arrangement of the auxiliary passages used in this case. The two pressure-chambers I and I' are here united by the pipes $b$ and $b'$, so as to form practically a single chamber. The auxiliary passages S and U lead to the main passage on the two sides of the pair of main valves, respectively, and the upper middle port of the cock N is connected to the space between the two main valves, which themselves perform the functions of the check-valves Y and Z in Fig. 5.

The same arrangement of by-pass passages and check-valves may be used with coupled main valves as with a single valve, if it is preferred to do so, in which case the intermediate passage V' may be omitted. The manipulation of the auxiliary valve in the combination of Fig. 6 is in any case exactly the same as in that of Fig. 5, and the two main valves act simultaneously, performing the same functions as the single valve of Fig. 5.

The small cocks $c$ in Figs. 4, 5, and 6 are designed to permit the escape of air from the chambers and passages.

In Fig. 6 is illustrated a special device for regulating the speed of closing of the main valve, so as to prevent shocks due to suddenly checking the momentum of the water. This includes the piston $d$, fitting loosely inside the plunger G, and which, when the valve A is raised from its seat, rests upon the ledge $e$. $f$ represents a spring, sometimes added to aid in closing the main valve. Now suppose the valve A, Fig. 6, to be wide open and the fluid flowing from F to E. Then let the cock N be brought into its middle position, admitting pressure from the passage at F to the chamber I, which acts, in conjunction with gravity and the force of the spring $f$, to press the valve toward its seat. When the valve is within a certain small distance of its seat, the piston $d$ is stopped by contact with the disk $g$ on the central stud $h$, thus preventing the spring and the fluid from following the valve except only so fast as the fluid can enter the small chamber $i$ through the holes $j$ in the hollow stud $h$. These holes can be closed or opened more or less by the cock $k$, which can be adjusted by the square head $l$ and the check-nut $m$ on the outside of the casing. By this means the motion of the valve in closing can be checked at any determined distance from its seat and allowed to complete its descent as slowly as may be desired. It is to be noticed that this device does not interfere at all with a quick opening of the valve, for in the latter case the fluid in the chamber $i$ can raise the piston $d$ and escape freely between it and the disk $g$. The spring $f$ is an independent device, which may be used, if desired, to hasten the closing of the valve during the first part of its motion.

It being apparent that the details of construction and arrangement of parts in my invention are capable of considerable variation without departing from the principles involved in its operation, I do not confine my claims strictly to the specific forms of the mechanism shown and described; but

What I claim as my invention, and desire to secure by Letters Patent, is—

1. The combination of a valve for regulating the flow of a fluid through a port or passage, a piston, plunger, or equivalent device, adapted to operate the said valve, a fluid-chamber on one side of said piston or equivalent device, an auxiliary passage connecting the said chamber constantly with the main passage on one side of the main valve, tapering grooves at the sides of the piston, or equivalent devices, adapted to produce a gradual enlargement of the said passage as the main valve is opened, a second auxiliary passage connecting the said chamber with the main passage on the other side of the main valve, and an auxiliary valve adapted to open or close the latter auxiliary passage, by operating which the fluid-pressure in the said chamber may be adjusted, and the opening and closing of the said main valve controlled in the manner described, all substantially as set forth.

2. In a valve mechanism for regulating the flow of a fluid through a passage, the combination of a main valve, its port, actuating device, and pressure-chamber, arranged as described in said passage, a second similar valve, port, actuating device, and pressure-chamber, placed in series with the first in the same main passage, and facing the opposite way as regards the flow of the fluid, auxiliary passages connecting the said pressure-chambers with the main passage on each side of the main valves, and an auxiliary-valve mechanism, regulating the flow through the auxiliary passages, and which may be set either so as to hold the main valves closed against any tendency of the fluid to flow through the main passage in either direction, or so as to enable both main valves to be opened simultaneously by a flow in either one or the other direction, as determined by the setting of the auxiliary-valve mechanism, both automatically closing, or remaining closed, against a contrary flow, substantially as set forth, and for the purposes described.

3. In a valve mechanism substantially as herein described, the combination of the main and auxiliary valves and passages, the pressure-chamber, the actuating piston or plunger, and tapering grooves or slots in the sides of the cylinder surrounding the same, or equivalent means, whereby the area of the opening for the passage of fluid into or out of the said pressure-chamber around the actuating piston or plunger, is made to vary with the movement of the latter, in a manner corresponding approximately with the extent of opening of the main valve, substantially as set forth, and for purposes described.

4. In a valve mechanism substantially as herein described, the combination of the main and auxiliary valves and passages, the pressure-chamber, the actuating-piston, or equivalent thereof, by-pass passages communicating with the auxiliary valve and with the main fluid-passage on each side of the main valve or pair of main valves, and check-valves controlling the flow of the fluid through the said by-pass passages, substantially as set forth, and for purposes described.

5. In a valve mechanism substantially as herein described, the combination of the main and auxiliary valves and passages, the pressure-chamber, the actuating piston or plunger, a fixed ring surrounding the same, and a piece of flexible material adapted to lie across and cover the opening between the piston or plunger and the fixed ring, when the valve is shut, for the purpose of preventing leakage, substantially as set forth.

6. In a valve mechanism substantially as herein described, the combination of the main and auxiliary valves and passages, the pressure-chamber, the actuating-plunger G, the piston $d$ fitting the plunger G internally, the ledge $e$, on the plunger G, or an equivalent device, adapted to lift the piston $d$, the disk $g$, adapted to limit the movement of the piston $d$, the central hollow stud $h$, and the regulating-cock $k$ controlling the passage through the stud $h$, all substantially as set forth, and for purposes described.

In testimony whereof I affix my signature in presence of two witnesses.

HORACE B. GALE.

Witnesses:
G. W. UNDERWOOD,
WILLIAM NUTT.